C. E. INGLIS.
JOINTING DEVICE FOR THE MEMBERS OF MILITARY BRIDGES AND THE LIKE.
APPLICATION FILED OCT. 17, 1916.
1,231,365.
Patented June 26, 1917.
4 SHEETS—SHEET 1.
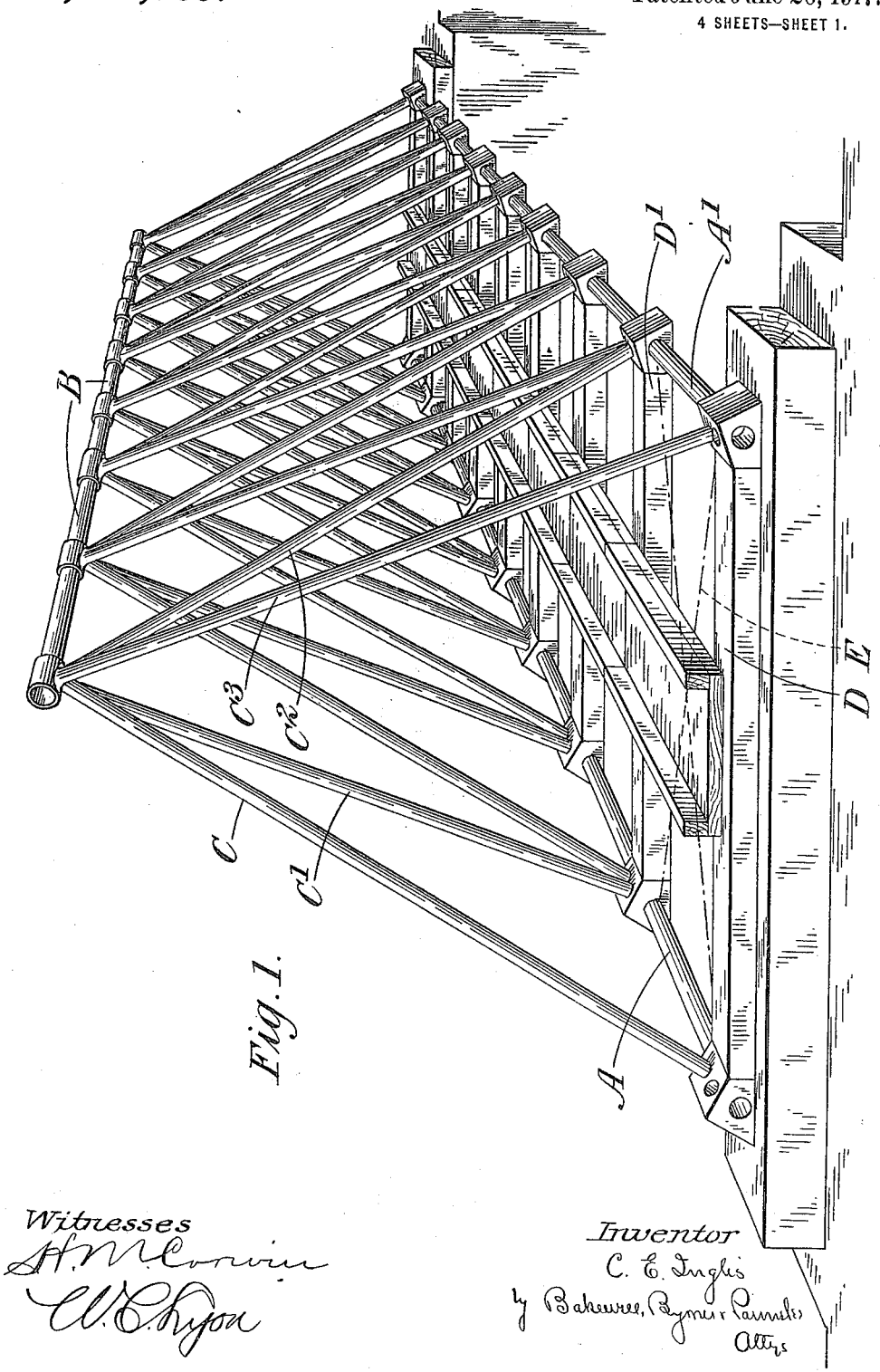

C. E. INGLIS.
JOINTING DEVICE FOR THE MEMBERS OF MILITARY BRIDGES AND THE LIKE.
APPLICATION FILED OCT. 17, 1916.
1,231,365.
Patented June 26, 1917.
4 SHEETS—SHEET 2.
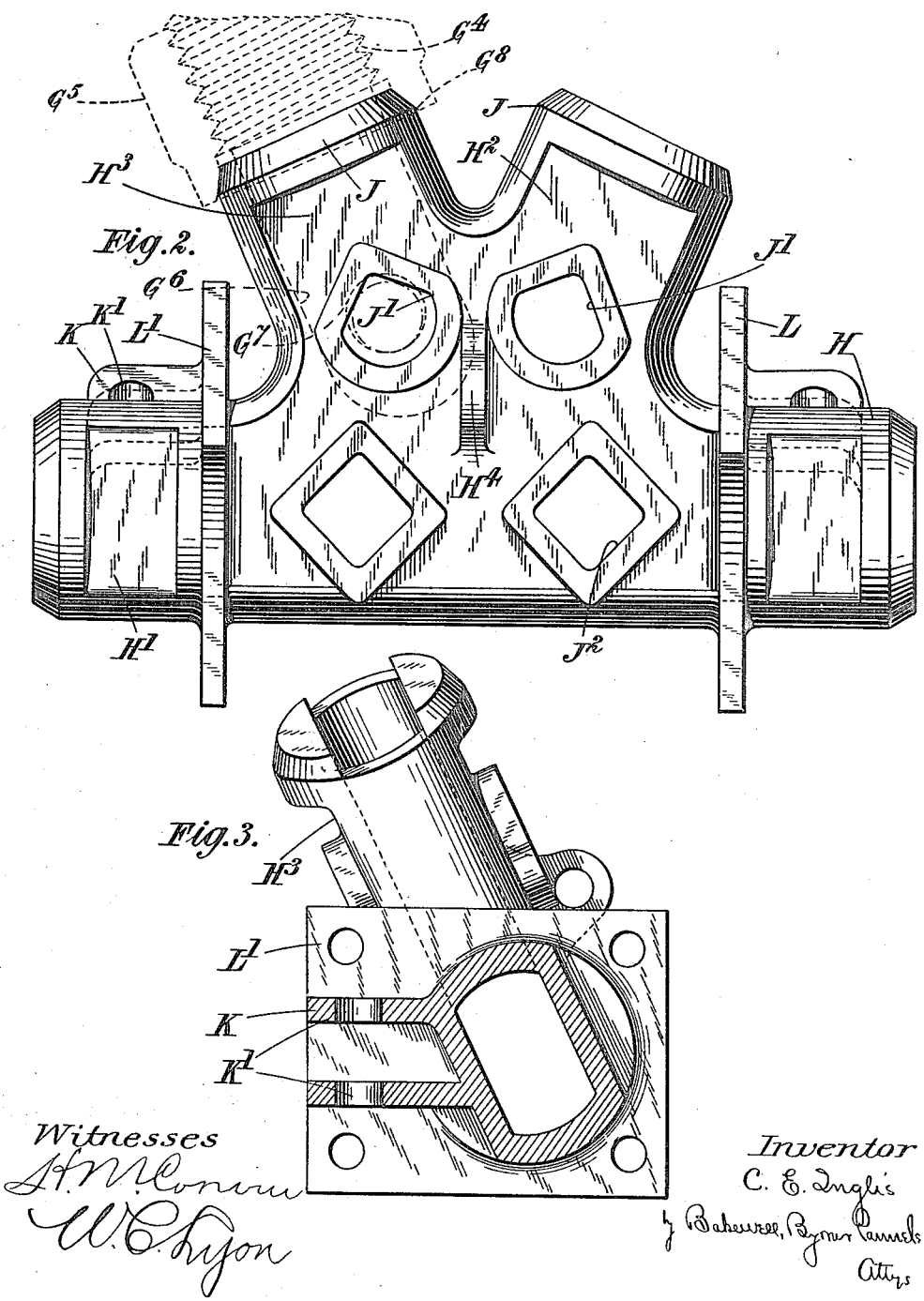

C. E. INGLIS.
JOINTING DEVICE FOR THE MEMBERS OF MILITARY BRIDGES AND THE LIKE.
APPLICATION FILED OCT. 17, 1916.

1,231,365.

Patented June 26, 1917.
4 SHEETS—SHEET 3.

Witnesses

Inventor
C. E. Inglis

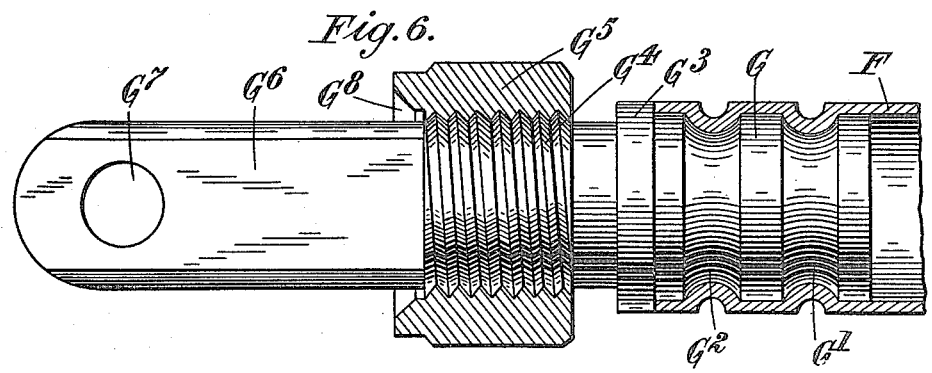
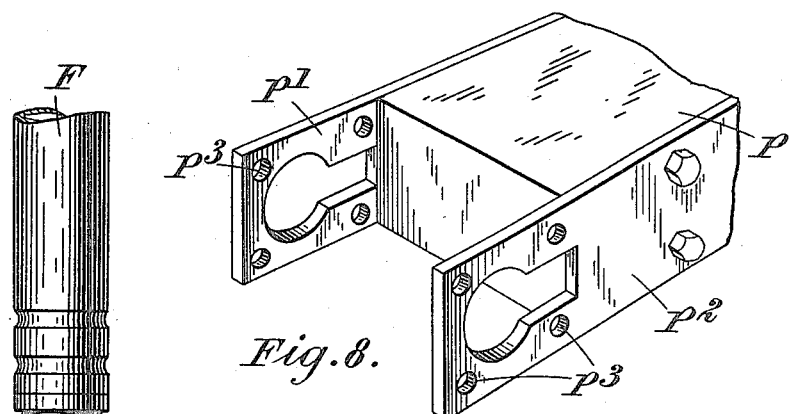
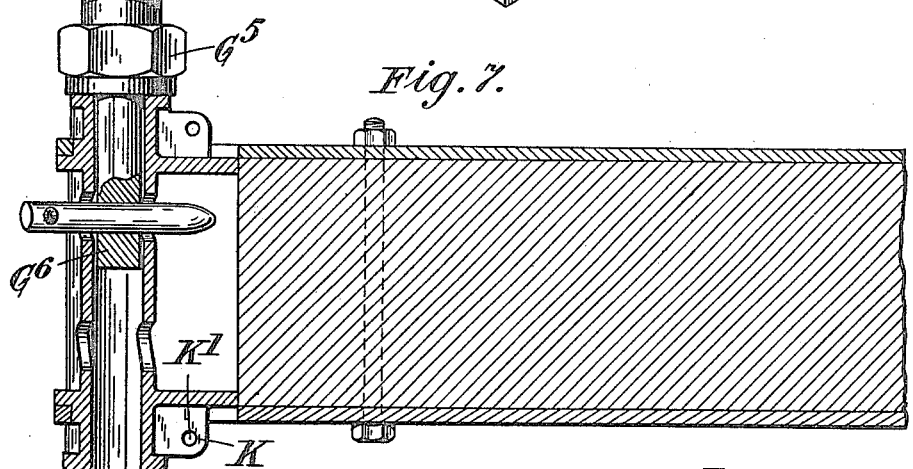

UNITED STATES PATENT OFFICE.

CHARLES EDWARD INGLIS, OF GRANTCHESTER, NEAR CAMBRIDGE, ENGLAND.

JOINTING DEVICE FOR THE MEMBERS OF MILITARY BRIDGES AND THE LIKE.

1,231,365. Specification of Letters Patent. Patented June 26, 1917.

Original application filed October 9, 1915, Serial No. 55,085. Divided and this application filed October 17, 1916. Serial No. 126,119.

*To all whom it may concern:*

Be it known that I, CHARLES EDWARD INGLIS, a subject of the King of England, residing at Grantchester, nr. Cambridge, England, have invented certain new and useful Improvements in Jointing Devices for the Members of Military Bridges and the like, of which the following is a specification.

This invention is for improvements in or relating to jointing devices for the members of military bridges and the like, and has for its object to provide means whereby the members of a bridge or other braced structure can be readily erected or taken to pieces for erection in another position if desired, or permanently erected.

A primary object of the present invention is to provide means whereby all the members of the structure can be quickly and accurately brought into proper alinement during erection.

According to the present invention a joint-block or box for connecting a tie-rod or strut to another part comprises two parts on which are engaging coaxial coned surfaces, one of these surfaces carried by each of the parts to be joined, arranged with the cone axes in the line of pull or thrust and a pin-and-slot "reverse engagement" between the two parts, so constructed that the pin is held with its longitudinal axis intersecting the cone axis. Preferably the pin is a loose fit in the openings or slots which receive it, and the engagement of the coned surfaces operates to take up the looseness of the pin and aline the connected members as well as lock them together. A joint-block may be arranged to provide for two or more joints, all the joints being so arranged that their cone axes intersect at a point common to them all, so that the members when tightened up are rigidly fixed in predetermined directions.

Other features of the invention relate to details hereinafter fully described and illustrated with reference to the accompanying drawings, in which—

Figure 1 is a diagrammatic perspective view of a bridge to which the joint constituting the present invention is applicable;

Fig. 2 is an elevation of a joint-block used to connect the sections of the bottom longitudinal members of the structure shown in Fig. 1;

Fig. 3 is a side elevation, partly in section, of Fig. 2;

Fig. 6 is a view, partly in section, showing one method of connecting a frame-member to a joint-block. This part is shown in place in chain-lines in Fig. 2;

Fig. 7 is a plan partly in section showing the construction of the cross-struts and their method of connection to the joint-blocks, and Fig. 8 shows the construction of an end of a cross-strut.

Figure 4:
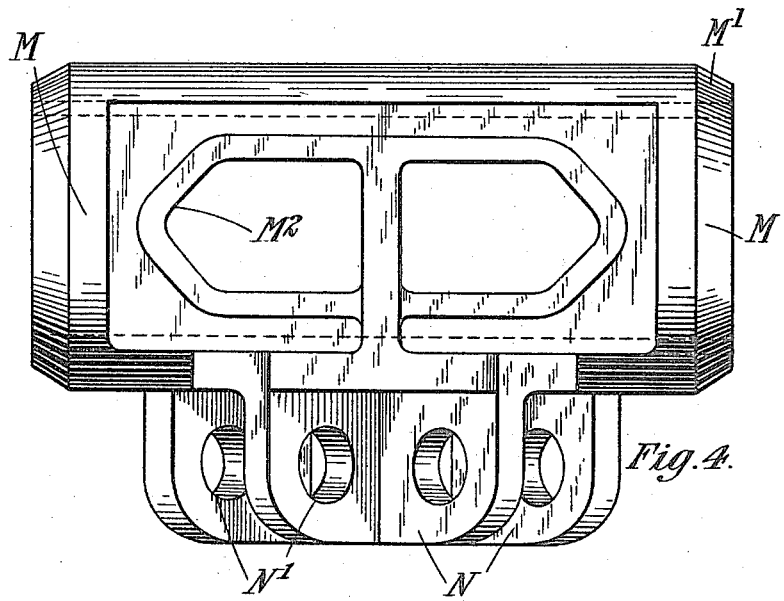
Fig. 4 is a side elevation of the joint-block used for connecting the sections of the top longitudinal member shown in Fig. 1.

The invention has been illustrated and will now be described as applied to the construction of a light military foot-bridge for infantry, constituting the subject-matter of a previous patent in my name No. 1181013, filed 9th November 1915.

The general construction of the bridge is illustrated in Fig. 1. The lower booms of the bridge are built up in sections A A$^1$ of weldless steel tube, any sufficient number of these being joined in series to provide the required length of structure. The upper boom is similarly built up of sections of weldless steel tube B.

The connection between the upper and lower booms is made by tubes C, C$^1$, C$^2$, C$^3$ which are arranged as shown in the form of a rectangular pyramid of which the two tubes A, A$^1$ form opposite sides of the base. The ends of these two base-members are connected by transverse struts D, D$^1$.

The joint between the bottom ends of the members of a bay, and also their joint with the adjacent members of the bay are effected by means of joint-blocks, and jointing connections on the ends of the tubes. These latter are illustrated in Fig. 6.

In the end of each tubular member F there is inserted a cylindrical plug G in which two encircling grooves G$^1$, G$^2$ have been formed. The projecting part of the plug is formed with a collar G$^3$ which butts against the end of the tube and with a screw-threaded part G$^4$ upon which there is provided a nut G$^5$. Beyond the threaded portion the end of the plug is flattened as at G$^6$ to form a tongue and this is pierced from one flat face to the other by a hole $G^7$ whose axis intersects the longitudinal axis of the tubular member F. The plug is secured in place by forcing, for example rolling, the metal of the tube wall into the grooves $G^1$ $G^2$ on the plug. The weight of the plug is conveniently reduced by boring it to a convenient depth from the end which is subsequently inserted in the tube F.

The nut $G^5$ has formed on the face of it toward the tongue $G^6$ a conical recess $G^8$, the purpose of which will be hereinafter described.

The joint-block is illustrated in Figs. 2 and 3 and in this particular instance it is in the form of a box-casting having four tubular sockets.

Two of these H, $H^1$, are in line with one another to receive the adjacent lower boom members $A^1$, and above these are two other sockets $H^2$ $H^3$ inclined to one another V-fashion to receive the diagonal or web members $C^2$ or $C^3$, one of these diagonals belonging to one section or bay of the bridge and the other to the next adjacent bay.

Only one of the sockets need be described in detail as the others are similar. The outer end of the socket $H^2$ is coned as at J to fit the coned recess $G^8$ in the nut $G^5$ above described and the interior of the socket is shaped to receive the tongue $G^6$. The socket is made somewhat larger than the tongue so that the latter can be easily inserted, being subsequently centered by the engagement of the coned surfaces. It will be appreciated that the surface J may be made cylindrical instead of conical, and that it would still automatically center itself in the coned recess $G^8$ in the nut. Some distance from the outer end of the socket, it is traversed by a sector-shaped slot or opening $J^1$ which has its V toward the open end of the socket and on the center line of the coned part J. Instead of using sector-shaped holes they may be made approximately rectangular as at $J^2$, being arranged with a diagonal on the axis of the corresponding coned portion of a socket. In any case the four holes for the four sockets are so placed as to surround a central point at which the axes of the four sockets intersect.

It is important in the manufacture of the joint-block that the V-shaped holes traversing the sockets should be exactly in line with the axis of the cone for the corresponding socket. The tube is engaged with the socket as shown in dotted lines in Fig. 2 by inserting the tongue $G^6$ into the socket until the hole $G^7$ registers with the hole $J^1$ when a pin can be inserted therethrough; this pin for ease in erection is made a loose fit both in the opening J and in the hole $G^7$, this looseness being somewhat exaggerated for clearness in Fig. 2. The nut $G^5$ is then screwed down until its coned portion $G^8$ engages with the coned portion J on the socket. This action takes up the slackness of the pin in the opening J and in the hole $G^7$ and it also serves to hold the tube end so that its direction as well as its position is rigidly fixed.

On the side of the sockets H, $H^1$ which receive the horizontal or boom members $A^1$, there is cast a double flange K which is provided with two holes $K^1$ which constitute a fastening for the diagonal or sway bracing (hereinafter described) of the four bottom members of the pyramid. These joint-blocks are further provided with flanges L, $L^1$ by which they are secured to the transverse struts or floor-carrying members of the bridge. Each of these struts carries one of the blocks at each end and the various tube-members are connected to it in erecting the bridge.

Figure 5:
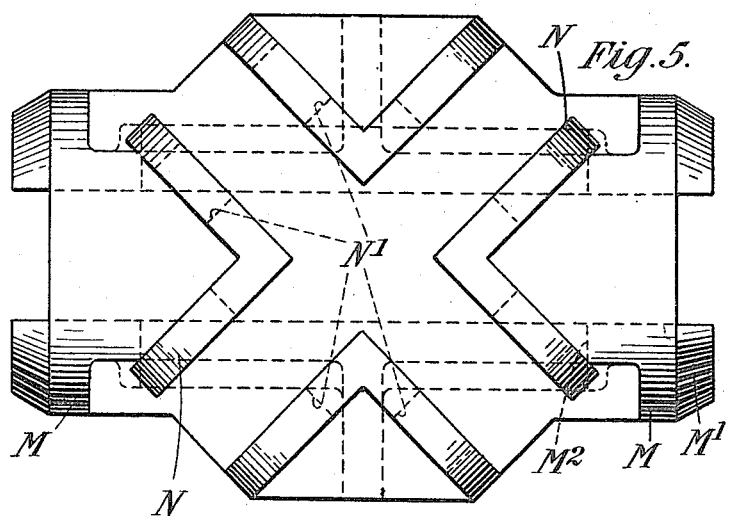
Fig. 5 is an underside view of the joint-block shown in Fig. 4.

The joint-block to be used in connection with the tubes B (Fig. 1) which constitute the upper longitudinal member of the structure are illustrated in Figs. 4 and 5. This joint-block comprises two tubular sockets M which are coned on the outside at $M^1$ and provided with a V-shaped hole $M^2$ similar to the sockets already described with reference to Fig. 2. On the underside of the block are cast four pairs of flanges N which are bored through at $N^1$. The tubes $C^2$, $C^3$ are provided at their upper ends with tongues similar to those illustrated in Fig. 6, but without the screw-threaded portion and coned nut, and these tongues are received between the two flanges and secured by a pin passed through the flanges and the tongue.

Where pins are used for making joints in the various sockets, the pins are preferably secured to the casting by means of chains. In the example illustrated in Fig. 2 a small web $H^4$ is provided at the middle to which the chains for the four pins required may be secured.

The transverse struts hereinbefore referred to are illustrated in Figs. 7 and 8. They consist preferably of wooden beams reinforced by steel side plates screwed or bolted to the wooden part of the member.

Fig. 8 shows the construction of the end of the struts D, $D^1$ according to which the steel plates $P^1$, $P^2$ extend beyond the wooden portion P and are provided with openings to receive the sockets H, $H^1$, Fig. 2. Further holes $P^3$ are provided in these bridging portions of the plate to permit the flanges L, $L^1$ to be secured to the strut by bolts. Thus each joint block is permanently mounted between the jaws thus provided by the projecting plates $P^1$ $P^2$, as shown in Fig. 7.

It will be seen that these joints are so constructed that they are able to resist both compression and tension strains, so that a bridge such as that shown in Fig. 1, in which the elements are connected with the joints described, can be equally well inverted and the roadway provided on the underside of the ties D, D¹ instead of on the upper side as viewed in Fig. 1.

Instead of securing the tubes to the plugs G by pressing them into the grooves G¹ G² the said grooves may be dispensed with and the tubes can be shrunk on to the plugs and further secured by welding, for example by an oxy-acetylene flame.

It will be understood that the joint-blocks described are not confined to the one form of bridge shown in Fig. 1, their description with reference to that particular construction being only by way of example. Obviously the joint-blocks may be made to provide for joints at various angles according to the structure to which they are to be applied, the principle, however, always being the same, namely, that of providing the coöperating coned surfaces, one on the joint-block and the other on the member to be connected to the block and locking the parts together by a pin-and-slot "reverse engagement" so that all the parts can be drawn tightly together and into proper alinement by the mere tightening up of the parts.

The term "reverse engagement" used in this specification and the appended claims is employed to indicate an engagement of such a character as will retain the parts engaged against the application of a force in the reverse direction to that which tends to press together the two coned surfaces already mentioned, thus the nut G⁵ presses the coned surfaces G⁸ and J together when resisted by the reverse pull of the pin inserted in the holes G⁷ and J¹.

What I claim as my invention and desire to secure by Letters Patent is:—

1. In a joint-box for connecting a structure member to another part the combination with the joint-box of a structure member which enters the box, the box and structure member having mutually engaging coned surfaces one on each of these parts, the said surfaces being coaxial with the direction of the stress in the structure member, and a pin-and-slot connection between the box and the said structure member arranged with the longitudinal axis of the pin intersecting the cone axis and holding the box and member together against forces tending to separate the coned surfaces, substantially as and for the purpose described.

2. In a joint-box for connecting structure members the combination of a joint-box into which the structure members can enter, each structure member having a coned surface which engages a corresponding coned surface on the box the coöperating coned surfaces being coaxial with the direction of the stress in the structure member, and a pin-and-slot connection between the box and each structure member arranged with the longitudinal axis of the pin intersecting the cone axis of the structure member to which the pin is alloted and holding the box and member together against forces tending to separate the coned surfaces, substantially as and for the purposes described.

3. In a joint-box for connecting structure members the combination of a joint-box into which the structure members can enter, each structure member having a coned surface which engages a corresponding coned surface on the box the coöperating coned surfaces being coaxial with the direction of the stress in the structure member, one of these coned surfaces being formed as a nut which can be screwed tight home against the other coned surface, and a pin-and-slot connection between the box and each structure member arranged with the longitudinal axis of the pin intersecting the cone axis of the structure member to which the pin is allotted and holding the box and member together against forces tending to separate the coned surfaces, substantially as and for the purposes described.

4. In a joint-box for connecting a structure member to another part the combination with the joint-box of a structure member which enters the box, the box and structure member having mutually engaging coned surfaces one on each of these parts, the said surfaces being coaxial with the direction of the stress in the structure member, and a pin-and-slot connection between the box and the said structure member arranged with the longitudinal axis of the pin intersecting the cone axis and holding the box and member together against forces tending to separate the coned surfaces, the pin of each pin-and-slot connection being a loose fit in the openings provided for it and the engagement of the coned surfaces is such as to take up the looseness of the pin and aline the structure member relatively to the joint-box as well as lock it thereto, substantially as and for the purpose described.

5. In a joint-box for connecting structure members the combination of a joint-box into which the structure members can enter, each structure member having a coned surface which engages a corresponding coned surface on the box the coöperating coned surfaces being coaxial with the direction of the stress in the structure member, the axes of the various coöperating coned surfaces being so arranged that they intersect at a point common to them all, and a pin-and-slot connection between the box and each structure member arranged with the longitudinal axis of the pin intersecting the cone axis of the structure member to which the pin is allotted and holding the box and member together against forces tending to separate the coned surfaces, substantially as and for the purposes described.

6. In a joint-box for connecting structure members the combination of, a structure member having at one end a pair of parallel projecting tongues (P¹ P²) provided with key-hole slots, a joint-box having trunnion-like shouldered portions channeled at the sides so that they can be entered in the round portions of the key-hole slots and then moved along to the straight portions of the same where the flattened sides will hold the joint against swinging movement, means for retaining the joint in this position in the key-hole slots, the joint-box being so constructed that the structure members to be connected together can enter it, each structure member having a coned surface which engages a corresponding coned surface on the box the coöperating coned surfaces being coaxial with the direction of the stress in the structure member, and a pin-and-slot connection between the box and each structure member arranged with the longitudinal axis of the pin intersecting the cone axis of the structure member to which the pin is allotted and holding the box and member together against forces tending to separate the coned surfaces, substantially as and for the purposes described.

7. In a joint-box for connecting structure members the combination of a joint-box having two sockets axially alined one with the other to receive the ends of axially alined structure members and two sockets situated between these, whose axes are inclined away one from the other, which sockets also receive the ends of structure members, each structure member having a coned surface which engages a corresponding coned surface on the end of its receiving socket, each pair of coöperating coned surfaces being coaxial with the direction of stress in the structure member to which the pair is allotted, and a pin-and-slot connection between the box and each structure member arranged with the longitudinal axis of the pin intersecting the cone axis of the structure member to which the pin is allotted and holding the box and member together against forces tending to separate the coned surfaces, substantially as and for the purposes described.

In testimony whereof I have signed my name to this specification.

CHARLES EDWARD INGLIS.

Copies of this patent may be obtained for five cents each, by addressing the "Commissioner of Patents, Washington, D. C."